US008881219B2

(12) United States Patent  (10) Patent No.: US 8,881,219 B2
Kamijima                   (45) Date of Patent: Nov. 4, 2014

(54) VIDEO SERVER CONTROLLER, OPERATION METHOD, RECORDING MEDIUM FOR RECORDING OPERATION PROGRAM, AND VIDEO SERVER SYSTEM

(71) Applicant: Kabushiki Kaisha Toshiba, Tokyo (JP)

(72) Inventor: Yuki Kamijima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/751,691

(22) Filed: Jan. 28, 2013

(65) Prior Publication Data

US 2013/0232527 A1 Sep. 5, 2013

(30) Foreign Application Priority Data

Mar. 5, 2012 (JP) .................................. 2012-048197

(51) Int. Cl.
    *H04N 7/173* (2011.01)
    *H04N 21/231* (2011.01)
    *H04N 21/472* (2011.01)

(52) U.S. Cl.
    CPC ........... *H04N 21/231* (2013.01); *H04N 21/472* (2013.01)
    USPC ............................................. 725/116; 725/32

(58) Field of Classification Search
    CPC .................. H04N 21/23424; H04N 21/44016; H04N 21/47217; H04N 21/437; H04N 21/637; H04N 21/6377
    USPC .................... 725/91, 88, 32, 46, 116
    See application file for complete search history.

(56) References Cited

U.S. PATENT DOCUMENTS

| | | | | |
|---|---|---|---|---|
| 5,900,904 A | * | 5/1999 | Okada et al. | 725/92 |
| 6,445,876 B1 | * | 9/2002 | Dosaka | 386/333 |
| 8,539,526 B1 | * | 9/2013 | Hundemer | 725/36 |
| 2002/0059621 A1 | * | 5/2002 | Thomas et al. | 725/87 |
| 2002/0131511 A1 | * | 9/2002 | Zenoni | 375/240.28 |
| 2003/0093802 A1 | * | 5/2003 | Cho et al. | 725/90 |
| 2004/0223725 A1 | * | 11/2004 | Koh et al. | 386/46 |
| 2004/0268413 A1 | * | 12/2004 | Reid et al. | 725/131 |

(Continued)

FOREIGN PATENT DOCUMENTS

JP  H07153243 A   6/1995
JP  2009-225332   10/2009

OTHER PUBLICATIONS

Japanese Office Action dated Jan. 21, 2014, and mailed to Patterson & Sheridan, LLP on Mar. 24, 2014, filed in Japanese counterpart Application No. 2012-048197, 3 pages.

*Primary Examiner* — Pankaj Kumar
*Assistant Examiner* — Timothy Newlin
(74) *Attorney, Agent, or Firm* — Patterson & Sheridan, LLP

(57) ABSTRACT

A video server controller has an instruction receiver, a command forming unit, and a command issuing unit. The instruction receiver receives the first instruction for recording the material data name of the program material data and the time code indicating the site of interruption of broadcasting of the program material data, and a second instruction for restarting broadcasting of the program material data from the interruption site. The command forming unit, upon receiving the first instruction, stores the material data name and the time code, and upon receiving the CUE UP WITH DATA command as the second instruction, which is standard to the VDCP protocol, the stored material data name and time code are read out. The command issuing unit issues the CUE UP WITH DATA command, the material data name, and the time code to the video server.

20 Claims, 2 Drawing Sheets

(56) References Cited

U.S. PATENT DOCUMENTS

| | | | |
|---|---|---|---|
| 2007/0089151 A1* | 4/2007 | Moore et al. | 725/132 |
| 2008/0212939 A1* | 9/2008 | Furuichi | 386/95 |
| 2008/0216134 A1* | 9/2008 | Tecot et al. | 725/92 |
| 2008/0250061 A1* | 10/2008 | Kim | 707/103 R |
| 2009/0106793 A1* | 4/2009 | Tecot et al. | 725/38 |
| 2009/0193101 A1* | 7/2009 | Munetsugu et al. | 709/219 |
| 2009/0313545 A1* | 12/2009 | Kim et al. | 715/720 |
| 2011/0072450 A1* | 3/2011 | Kokernak et al. | 725/23 |

* cited by examiner

VIDEO SERVER CONTROLLER, OPERATION METHOD, RECORDING MEDIUM FOR RECORDING OPERATION PROGRAM, AND VIDEO SERVER SYSTEM

CROSS-REFERENCE TO RELATED APPLICATION

This application is based upon and claims the benefit of priority from Japanese Patent Application No. 2012-048197, filed Mar. 5, 2012; the entire contents of which are incorporated herein by reference.

FIELD

Embodiments described herein relate to a video server controller that operates a video server controlling recording/playback of program data, an operation method for operating the video server, a recording medium for recording the operation program, and a video server system.

BACKGROUND

In the recent years, the VDCP (Video Disk Communication Protocol) protocol has been adopted as an industry standard control protocol for program data recording/playback in video servers used by video broadcasters. Typically, a control signal corresponding to the VDCP protocol is sent from a video server controller to a video server to control recording/playback of content data (broadcast program data).

However, sometimes regular program broadcasting might be interrupted by the broadcast station to insert a special program not originally planned. When a special program is inserted, it is desirable that playback of the regular program be restarted from the location just before insertion point of the special program. For this to happen, an instruction is sent to the video server requesting the name of the content data corresponding to the interrupted regular program and also a request for holding of the time code (TC-HOLD request) of the interruption point. It is then necessary to provide a RECUE request so that playback waits at the interrupted site after the end of the special program.

Unfortunately, the TC-HOLD request and RECUE request cannot be realized with the standard commands of the VDCP protocol. Consequently, after the interrupting program has finished, to restart playback of the regular program from the position just before the interruption, it is necessary for the video server controller and the video server to communicate using SECNET or some other independent control protocol, or alternatively to extend the VDCP protocol to provide an independent command for carrying out communication between the video server controller and the video server.

DETAILED DESCRIPTION

In general, the present disclosure will be explained with example embodiments with reference to figures.

As discussed above, to restart playback of the regular program from the site before the special program interruption, it is necessary to use an independent protocol or to extend the VDCP protocol to provide an independent command. However, when an independent protocol is adopted, it becomes necessary to have the video server and the video server controller correspond to this independent protocol, which may take substantial time and effort. Similarly, when the VDCP protocol is extended to provide an independent command, it is necessary to make the video server and video server controller correspond to this independent command, which may also require substantial time and effort.

According to the present disclosure, there is provided a video server controller, an operation method for operating the video server, an operation program for operating the video server, a recording medium for recording the operation program, and a video server system that can restart playback of the regular program from the site before the interruption by the special program without extending the VDCP protocol to provide an independent command or using an additional communication protocol.

According to an example embodiment of the present disclosure, the video server controller has an instruction receiving unit, a command forming unit, and a command issuing unit. Here, the instruction receiver receives the first instruction for recording the program data name and the time code indicating the site of broadcast interruption of the program data. The instruction receiver also receives a second instruction for restarting the broadcasting of the program data from the interruption point.

The command forming unit works as follows: upon receiving the first instruction, the program data name and the time code are stored in a storage medium; and then upon receiving the second instruction, the CUE UP WITH DATA command is formed at the same time the program data name and the time code stored in the storage medium are read out and supplied for inclusion with the CUE UP WITH DATA command. The issuing unit issues the formed CUE UP WITH DATA command, as well as the read out program data name and time code, to the video server.

Figure 1:
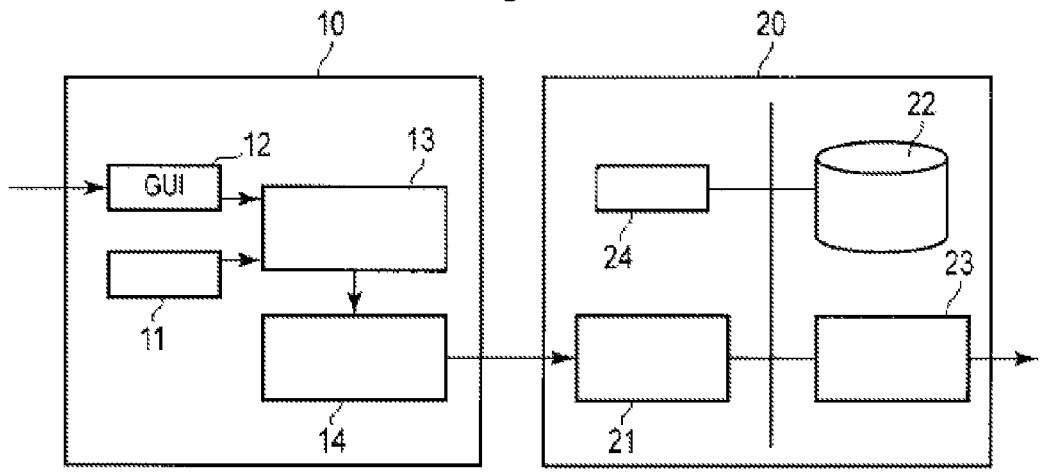
FIG. 1 is a block diagram providing a schematic depiction of the components of a video server system having a video server controller related to the present embodiment.

FIG. 1 is a block diagram illustrating the functional arrangement of the video server system having a video server controller 10 related to the present embodiment. As shown in FIG. 1, the video server system has a video server controller 10 and a video server 20. Here, the video server controller 10 and the video server 20 are connected by a LAN (local area network) cable, but this is only an example and other connection schemes are contemplated by this disclosure.

The example video server controller 10 has a CPU (central processing unit) and a memory 11 that can store programs and data for CPU to execute processing, such as ROM (read-only memory) or RAM (random access memory), or the like. To execute the operation program, or the like, stored in the memory 11 by the CPU, the video server controller 10 has the functions of a GUI (Graphical User Interface) 12, a VDCP command forming unit 13, and a command issuing unit 14.

Here, the GUI 12 is an interface that receives the input from a user by displaying a graph as the user manipulates the video server 20 on a monitor (not shown in the figure) connected with the video server controller 10 or a monitor (not shown in the figure) equipped in the video server controller 10. Here, the graph is a display based on a combination of windows, icons and buttons, etc. In the present example embodiment, items displayed on the monitor include the TC-HOLD icon for input of the request for the program data name and holding of the time code (TC-HOLD request) and the RECUE icon for input of the RECUE request as standby for playback. The user can use a mouse or other pointing device (not shown in the figure) to select the TC-HOLD icon or RECUE icon displayed on the monitor.

By means of the GUI 112, the VDCP command forming unit 13 receives the request of the user and forms the VDCP command corresponding to the received request. Also, the VDCP command forming unit 13 executes the processing corresponding to the received request. For example, suppose the user selects the TC-HOLD icon and inputs the program data name and the time code of interruption for the special program at the same time, the VDCP command forming unit 13 stores the input program data name and time code in the memory 11. When the user selects the RECUE icon, the VDCP command forming unit 13 forms the CUE UP WITH DATA command according to the VDCP protocol, and outputs it to the command issuing unit 14 together with the program data name and time code stored in the memory 11.

The command issuing unit 14 outputs the VDCP command formed by the VDCP command forming unit 13 to the video server 20. For example, the command issuing unit 14 outputs the CUE UP WITH DATA command, the program data name, and the time code fed from the VDCP command forming unit 13 to the video server 20.

The video server 20 has an interface 21, a storage 22, a decoder 23, and a controller 24.

The interface 21 receives the VDCP command sent from the video server controller 10 and outputs the received VDCP command to the controller 24. For example, when the video server controller 10 sends the CUE UP WITH DATA command, the program data name, and the time code, the interface 21 outputs the sent CUE UP WITH DATA command, the program data name and the time code to the controller 24.

The storage 22 records a plurality of program data, and reads out the recorded program data under control of the controller 24.

Based on a preset encoding system, the decoder 23 decodes and outputs the program data read from the storage 22 under control of the controller 24.

On the basis of the VDCP command received from the interface 21, the controller 24 controls the operation of the video server 20. For example, when the interface 21 sends the CUE UP WITH DATA command, the program data name, and the time code, the controller 24 controls the storage 22 and the decoder 23 so that the program data assigned by the program data name enter standby and become available for playback from at the point assigned by the time code.

In the following, a detailed explanation will be given on the operation in the video server system arranged for restarting playback of the regular program after the end of the special program from the point before interruption by the special program.

Figure 2:
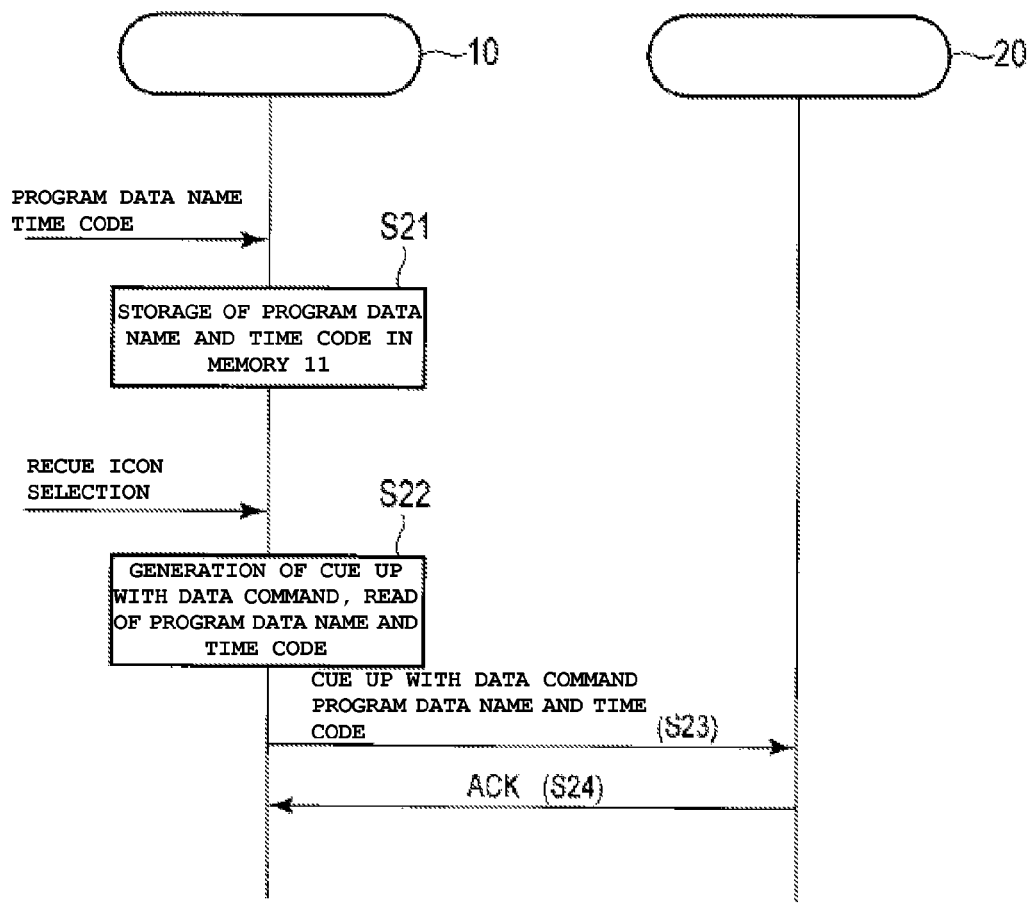
FIG. 2 is a diagram illustrating the sequence of communication between the video server controller and the video server by the video server system shown in FIG. 1 when the interrupted playback of the program data is restarted.
Figure 3:
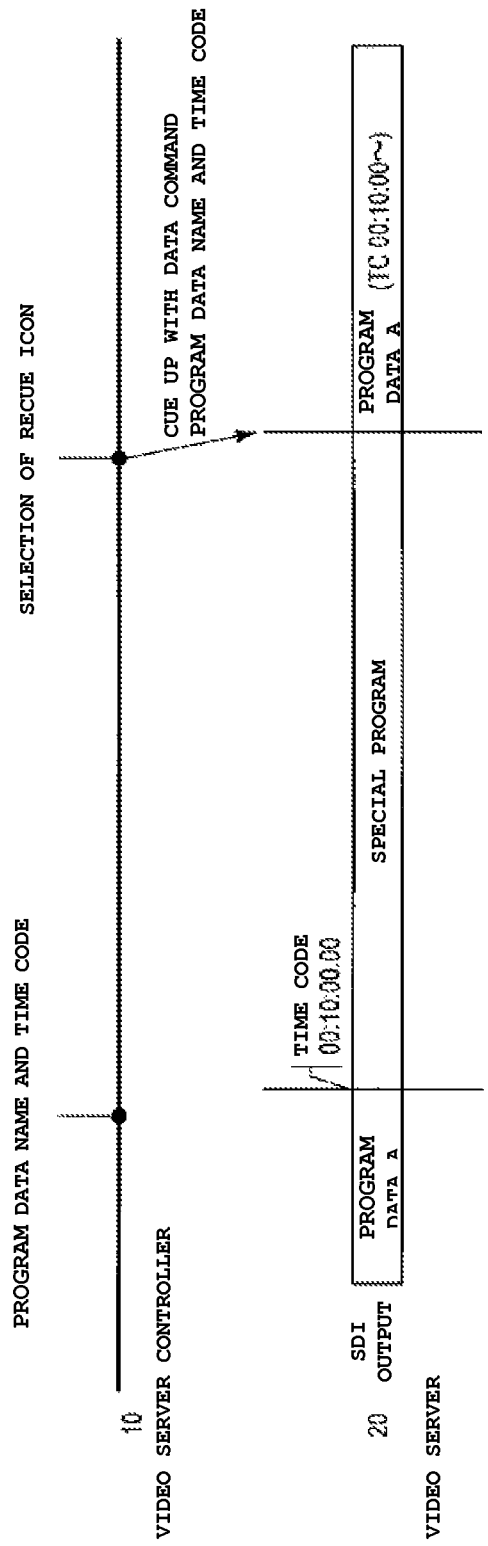
FIG. 3 is a diagram illustrating an example of the program data sent from the video server shown in FIG. 1.

FIG. 2 is a diagram illustrating the sequence of communication between the video server controller 10 and the video server 20 in a video server system for restarting playback of the regular program from the point before interruption by the special program related to the present embodiment. FIG. 3 is a diagram illustrating an example of the program data sent from the video server 20.

When the broadcasting of the regular program is interrupted for the special program, a user selects the TC-HOLD icon displayed on the GUI 112, and then the user inputs the program data name "A" for the program data then being broadcast and the time code of the program data as, for example, "00:10:00.00" as the time point of interruption by the special program.

The VDCP command forming unit 13 then stores the input program data name "A" and the time code "00:10:00.00" in the memory 11 (step S21).

After the end of the broadcasting of the special program, the user selects the RECUE icon displayed on the GUI 112.

On the basis of the selected RECUE icon, the VDCP command forming unit 13 forms the CUE UP WITH DATA command, and at the same time it reads out the program data name "A" and the time code "00:10:00.00" from the memory 11 (step S22). The command issuing unit 14 outputs the program data name "A" and the time code "00:10:00.00" to the video server 20 together with the CUE UP WITH DATA command (step S23). Upon receiving the CUE UP WITH DATA command, the video server 20 returns ACK (acknowledgement) to the video server controller 10 (step S24). As a result, as shown in FIG. 3, playback from the video server of the program data A is restarted from the time code of "00:10:00.00" after the end of the special program.

As explained above, for this example embodiment, when the regular program is interrupted for the special program, the video server controller 10 stores the program data name of the interrupted program data and the time code of the program data at the time of the interruption in the memory 11. Then, after the end of the special program, it forms a CUE UP WITH DATA command when instructed by the user, and it outputs the recorded program data name, the time code, and the CUE UP WITH DATA command to the video server 20.

In the related art, in order for the video server 20 to restart playback of the regular program from the point before interruption by the special program, SECNET or other independent protocol or an extended VDCP protocol, was required to output the TC-HOLD request upon interruption by the special program. Then after the end of the special program, the RECUE request was output to the video server 20. But, according to a present embodiment, at the time of interruption by the special program, the program data name and the time code are recorded, and then after the end of the special program, the CUE UP WITH DATA command is output to the video server 20 (rather than a RECUE request). Therefore, it is possible to restart playback of the regular program from the point before interruption by the special program using just the standard VDCP protocol commands. Consequently, using the video server controller 10 related to the present embodiment it is possible to restart playback of the regular program from the point before interruption for the special program after the end of the special program without using an independent protocol or without using an independent command based on extension of the VDCP protocol.

In the present embodiment, explanation has been made on the case when the video server controller 10 has the GUI 112. However, the present disclosure is not limited to this scheme and other controller interface schemes are contemplated. For example, the video server controller 10 may have an instruction receiver that enables direct input of the instruction from the user. In this case, the instruction receiver may have a first dedicated button for storing the program data name and the time code in the memory 11 and a second dedicated button for forming the CUE UP WITH DATA command in the VDCP command forming unit 13. In addition, it may have a third dedicated button for storing the program data name and the time code in the memory 11 and for forming the CUE UP WITH DATA command in the VDCP command forming unit 13. Also, even without arranging the first and second dedicated buttons, the existing buttons may be used to execute the treatments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

What is claimed is:

1. A video server controller, comprising:
   an instruction receiver configured to receive first and second instructions, the first instruction indicating that a program data name corresponding to a program data being broadcast and a time code corresponding a point of interruption in the broadcasting of the program data are to be stored in a storage medium, and the second instruction indicating that broadcasting of the program data is to be restarted from the point of interruption;
   a command forming unit configured to receive instructions from the instruction receiver and configured to store the program data name and the time code in the storage medium upon receiving the first instruction, and form a CUE UP WITH DATA command, the CUE UP WITH DATA command being a standard Video Disk Communication Protocol command, and read out the program data name and the time code stored in the storage medium upon receiving the second instruction; and
   a command issuing unit configured to issue the formed CUE UP WITH DATA command with the program data name and the time code.

2. The video server controller according to claim 1, wherein the instruction receiver has at least one button, which when actuated a first time causes the issuance of the first instruction.

3. The video server controller according to claim 2, wherein the at least one button when actuated a second time after the first time causes the issuance of the second instruction.

4. The video server controller according to claim 1, wherein the instruction receiver is configured to display on a monitor at least one icon which when selected a first time by a user issues the first instruction and when selected a second time by the user issues the second instruction.

5. The video server controller according to claim 1, wherein the instruction receiver is configured to display a graphical user interface including:
   a first icon which when selected issues the first instruction; and
   a second icon, which when selected issues the second instruction.

6. The video server controller according to claim 1, wherein the storage medium comprises random access memory.

7. The video server controller according claim 1, wherein the storage medium comprises a disk drive.

8. The video server controller according to claim 1, wherein the command forming unit is configured to issue commands corresponding to standard video disk communication protocol (VDCP).

9. A video distribution system, comprising:
   a video server; and
   a video server controller connected to the video server, the video server controller including:
      an instruction receiver configured to receive first and second instructions, the first instruction indicating that a program data name corresponding to a program data being broadcast and a time code corresponding a point of interruption in the broadcasting of the program data are to be stored in a storage medium, and the second instruction indicating that broadcasting of the program data is to be restarted from the point of interruption;
      a command forming unit configured to receive instructions from the instruction receiver and configured to store the program data name and the time code in the storage medium upon receiving the first instruction, and form a CUE UP WITH DATA command, the CUE UP WITH DATA command being a standard Video Disk Communication Protocol command, and read out the program data name and the time code stored in the storage medium upon receiving the second instruction; and
      a command issuing unit configured to issue the formed CUE UP WITH DATA command with the program data name and the time code.

10. The video distribution system of claim 9, wherein the video server is connected to the video server controller via a local area network connection.

11. The video distribution system of claim 9, further comprising:
    a video server storage device attached to the video server for storing video data for broadcasting.

12. The video distribution system of claim 9, further comprising:
    a video monitor configured to display a graphical user interface for controlling the operation of the video server.

13. The video distribution system of claim 12, wherein the graphical user interface includes:
    a first icon which when selected issues the first instruction; and
    a second icon, which when selected issues the second instruction.

14. The video distribution system of claim 9, wherein the video server includes:
    a local controller;
    an interface unit configured to receive commands and data from the video server controller and output the commands and the data to the local controller;
    a broadcast program storage device for storing a plurality of program data; and
    a decoder under the control of the local controller for reading out program data stored in the broadcast program storage device, the decoder,
    wherein the local controller upon receiving the CUE UP WITH DATA command and the program data name and time code from the interface unit, causes the corresponding program data to be stored in the broadcast program storage device so as to make the corresponding program data available for playback.

15. A method of operating a video distribution system, comprising:
    sending a first instruction when a broadcast program is interrupted, the first instruction causing a program data name of the broadcast program and a time code indicating a point of interruption to be stored in a storage medium located in a video server controller;
    sending a second instruction to restart playback of the broadcast program from the point of interruption, the second instruction causing a CUE UP WITH DATA command to be formed, the CUE UP WITH DATA command being a standard Video Disk Communication Protocol command, and the program data name and the time code to be read from the storage medium; and
    sending the CUE UP WITH DATA command with the program data name and the time code to a video server.

16. The method of claim 15, wherein the sending of the first instruction is caused by pressing a button.

17. The method of claim 15, wherein the sending of instructions is controlled with a graphical user interface.

18. The method of claim 15, further comprising:
restarting playback of the broadcast program from the point of interruption when the CUE UP WITH DATA is received by the video server.

19. The method of claim 15, further comprising:
storing the broadcast program in the storage medium of the video server for rebroadcasting.

20. The method of claim 15, wherein the broadcast program is being transmitted to a plurality of viewers in different locations.

* * * * *